United States Patent
Tao et al.

(10) Patent No.: US 9,127,729 B2
(45) Date of Patent: Sep. 8, 2015

(54) METHOD OF LEARNING A CLUTCH KISS POINT FOR A CLUTCH OF A DUAL CLUTCH TRANSMISSION

(71) Applicant: GM GLOBAL TECHNOLOGY OPERATIONS LLC, Detroit, MI (US)

(72) Inventors: Xuefeng Tim Tao, Northville, MI (US); Daniel Deras, Brighton, MI (US); Jayson S. Schwalm, Farmington Hills, MI (US); Jeryl McIver, Inkster, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 207 days.

(21) Appl. No.: 13/968,748

(22) Filed: Aug. 16, 2013

(65) Prior Publication Data

US 2015/0051803 A1    Feb. 19, 2015

(51) Int. Cl.
     *B60W 10/02*      (2006.01)
     *F16D 48/06*      (2006.01)

(52) U.S. Cl.
     CPC .......... *F16D 48/06* (2013.01); *F16H 2342/042* (2013.01)

(58) Field of Classification Search
     None
     See application file for complete search history.

(56) References Cited

U.S. PATENT DOCUMENTS

| 5,411,124 | A | * | 5/1995 | Olson | 192/103 R |
|---|---|---|---|---|---|
| 6,086,514 | A | | 7/2000 | Jones et al. | |
| 8,725,372 | B2 | * | 5/2014 | Rinck et al. | 701/67 |
| 8,972,134 | B2 | * | 3/2015 | Yoon et al. | 701/67 |
| 2010/0114443 | A1 | * | 5/2010 | Terwart et al. | 701/68 |

* cited by examiner

*Primary Examiner* — Justin Holmes
(74) *Attorney, Agent, or Firm* — Quinn Law Group, PLLC

(57) ABSTRACT

A method of learning a kiss point of a first clutch of a dual clutch transmission includes controlling a rotational speed of the input shaft to be within a pre-determined range. When both the first clutch and the second clutch are determined to be disengaged from the input shaft, and the rotational speed of the input shaft is within the pre-determined range, then the first clutch is moved from a disengaged position into an engaged position. An increase in a rotational speed of a first transmission shaft, which is coupled to the first clutch, is detected. When the increase in the rotational speed of the first transmission shaft is detected, a position of the first clutch is identified. The identified position of the first clutch is saved in a memory of a transmission control module as a learned first clutch kiss point.

20 Claims, 2 Drawing Sheets

METHOD OF LEARNING A CLUTCH KISS POINT FOR A CLUTCH OF A DUAL CLUTCH TRANSMISSION

TECHNICAL FIELD

The invention generally relates to a method of operating a dual clutch transmission, and more specifically to a method of learning a kiss point for each of a first clutch and a second clutch of the dual clutch transmission.

BACKGROUND

A dual clutch transmission includes a first clutch and a second clutch. The first clutch is coupled to a first transmission shaft, and selectively connects the first transmission shaft to a transmission input. The second clutch is coupled to a second transmission shaft, and selectively connects the second transmission shaft to the transmission input. During operation of the dual clutch transmission, the first clutch may connect the first transmission shaft with the transmission input, while the second clutch disconnects the second transmission shaft from the transmission input. Alternatively, the first clutch may disconnect the first transmission shaft from the transmission input, while the second clutch connects the second transmission shaft from the transmission input. The engagement and disengagement of the first clutch and the second clutch must be precisely timed to properly execute these shifting operations.

In order to properly control the timing of the engagement and disengagement of the first clutch and the second clutch respectively, the kiss point for each of the first clutch and the second clutch must be known. The kiss point of the clutches is defined herein as the position of a clutch when the clutch makes initial frictional contact and begins transmitting torque between two different elements, e.g., the transmission input and a transmission shaft.

SUMMARY

A method of operating a dual clutch transmission is provided. The method includes determining that a first clutch is disengaged from an input shaft. A rotational speed of the input shaft is controlled to be within a pre-determined range. When the first clutch is determined to be disengaged from the input shaft, and the rotational speed of the input shaft is within the pre-determined range, then the first clutch is moved from a disengaged position into an engaged position. An increase in a rotational speed of a first transmission shaft, which is coupled to the first clutch, is detected. When the increase in the rotational speed of the first transmission shaft is detected, a position of the first clutch is identified. The identified position of the first clutch is saved in a memory of a transmission control module as a learned first clutch kiss point.

A method of learning a kiss point for both a first clutch and a second clutch of a dual clutch transmission is also provided. The method includes determining that both a first clutch and a second clutch are disengaged from an input shaft, and determining that both a first transmission shaft that is coupled to the first clutch, and a second transmission shaft that is coupled to the second clutch, are disengaged from an output shaft. A rotational speed of the input shaft is controlled to be within a pre-determined range. When both the first clutch and the second clutch are determined to be disengaged from the input shaft, both the first transmission shaft and the second transmission shaft are determined to be disengaged from the output shaft, and when the rotational speed of the input shaft is within the pre-determined range, the first clutch is moved from a disengaged position into an engaged position to engage the first transmission shaft and the input shaft. An increase in a rotational speed of the first transmission shaft is detected. When the increase in the rotational speed of the first transmission shaft is detected, a position of the first clutch is identified. The identified position of the first clutch is saved in a memory of a transmission control module as a learned first clutch kiss point. The process is repeated with the second clutch to identify a learned second clutch kiss point.

Accordingly, the kiss point of each of the first clutch and the second clutch, which is the location of the first clutch and the second clutch when the first clutch and the second clutch make initial frictional contact and begin transmitting torque respectively, may be quickly learned during assembly end-of-line test operations, and/or during maintenance and/or service of the dual clutch transmission. Knowing the kiss point for each of the first clutch and the second clutch allows the transmission control module to accurately and precisely control the operation of the dual clutch transmission.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims. Furthermore, the invention may be described herein in terms of functional and/or logical block components and/or various processing steps. It should be realized that such block components may be realized by any number of hardware, software, and/or firmware components configured to perform the specified functions.

Figure 1:
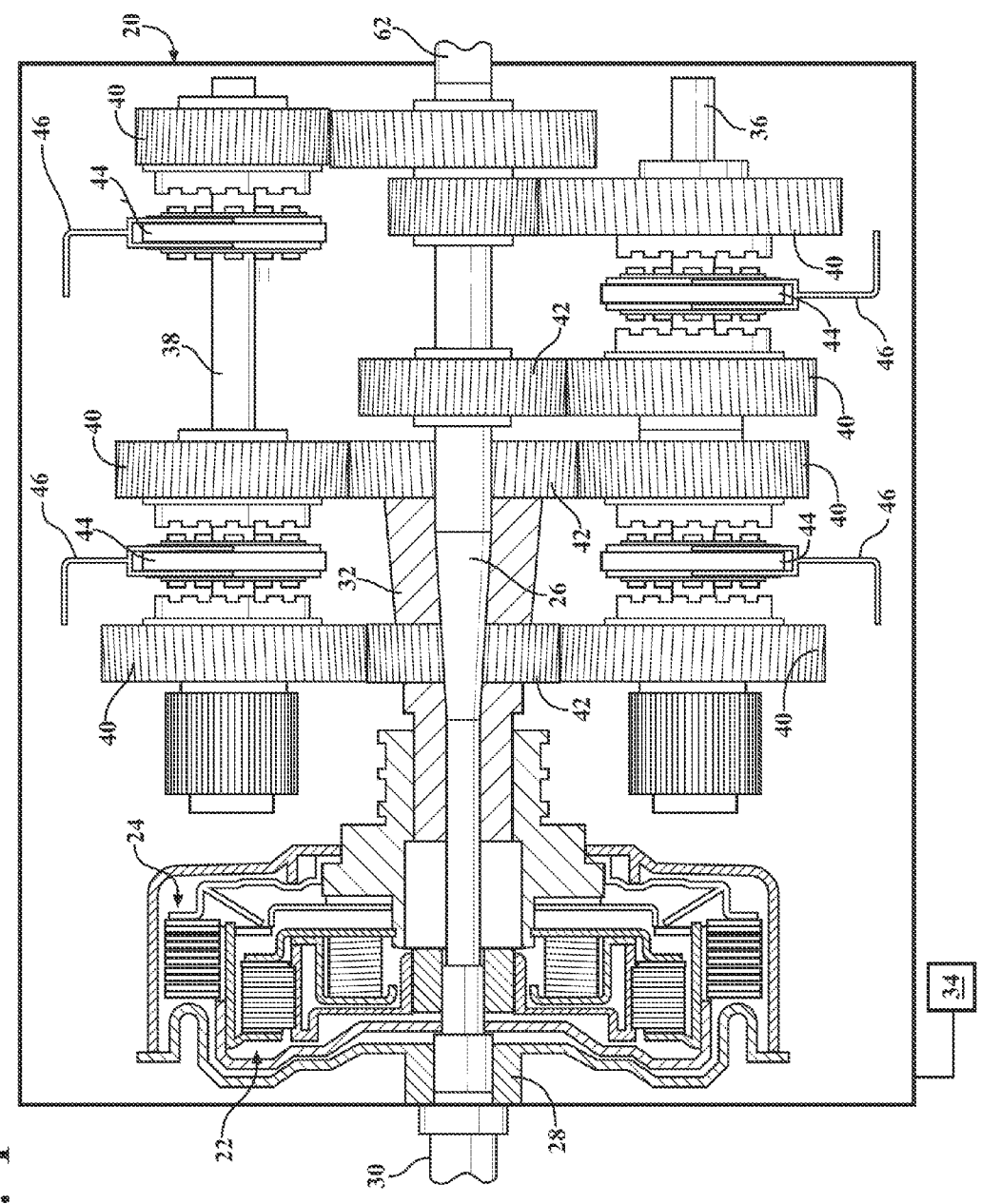
FIG. 1 is a schematic plan view of a dry dual clutch transmission.

Referring to the Figures, wherein like numerals indicate like parts throughout the several views, a transmission, hereinafter referred to as a dual clutch transmission, is generally shown at 20 in FIG. 1. While the invention is described relative to the exemplary dual clutch transmission 20 shown in FIG. 1, it should be appreciated that the invention may be utilized with other styles of transmission, not shown or described herein.

The dual clutch transmission 20 includes a first clutch 22 and a second clutch 24. The first clutch 22 is coupled to a first transmission shaft 26, and selectively connects the first transmission shaft 26 to a transmission input shaft 28. The input shaft 28 is coupled to an output 30 of an engine, e.g., a crankshaft. The second clutch 24 is coupled to a second transmission shaft 32, and selectively connects the second transmission shaft 32 to the input shaft 28. The first clutch 22 and the second clutch 24 may include, for example, but are not limited to, a wet clutch or a dry clutch. When engaged, the first clutch 22 interconnects the first transmission shaft 26 with the input shaft 28 to continuously transmit torque therebetween. When disengaged, the first clutch 22 disconnects the first transmission shaft 26 from the input shaft 28 to disallow torque transmission therebetween. Similarly, when the second clutch 24 is engaged, the second clutch 24 interconnects the second transmission shaft 32 with the input shaft 28 to continuously transmit torque therebetween. When disengaged, the second clutch 24 disconnects the first transmission shaft 26 from the input shaft 28 to disallow torque transmission therebetween.

A transmission control module 34 controls the actuation of the first clutch 22 and the second clutch 24 between their respective engaged and disengaged positions. The first clutch 22 and the second clutch 24 may be actuated in any manner suitable of the specific type and/or style of clutch utilized. For example, the first clutch 22 and the second clutch 24 may be moved by fluid pressure applied to respective pressure chambers (not shown), which causes one or more driving clutch plates to move toward and into frictional engagement with one or more driven clutch plates. Alternatively, the first clutch 22 and the second clutch 24 may be controlled by an electric current. Furthermore, it should be appreciated that the first clutch 22 and the second clutch 24 may be actuated in some other manner not described herein.

When disposed in the disengaged positions, neither the first clutch 22 nor the second clutch 24 transmit torque from the transmission input shaft 28 to the first transmission shaft 26 or the second transmission shaft 32 respectively. When actuated by the transmission control unit to move from the disengaged position into the engaged position, the friction plates of the respective clutches 22, 24 move towards each other. When the friction plates make initial contact with each other, the clutches 22, 24 begin to transmit torque. This is herein referred to as the "kiss point" of the clutches 22, 24. Accordingly, the "kiss point" of the first clutch 22 and the second clutch 24 is herein defined as the respective position of the first clutch 22 and the second clutch 24 when the first clutch 22 and the second clutch 24 make initial frictional contact and begin transmitting torque between two different elements, e.g., the transmission input shaft 28 and the first transmission shaft 26, or the transmission input shaft 28 and the second transmission shaft 32 respectively.

The first transmission shaft 26 may include either an inner transmission shaft or an outer transmission shaft, and the second transmission shaft 32 includes the other of the inner transmission shaft and the outer transmission shaft. The outer transmission shaft defines a hollow core, with the inner transmission shaft disposed therein and concentric with the outer transmission shaft as is known with dual clutch transmissions 20. FIG. 1 shows the first transmission shaft 26 as the inner transmission shaft, and the second transmission shaft 32 as the outer transmission shaft. However, it should be appreciated that the first transmission shaft 26 may alternatively be defined as the outer transmission shaft and the second transmission shaft 32 may be defined as the inner transmission shaft.

The dual clutch transmission 20 includes at least one layshaft. As shown, the dual clutch transmission 20 includes a first layshaft 36 and a second layshaft 38. However, it should be appreciated that the dual clutch transmission 20 need only include one layshaft. Each of the first layshaft 36 and the second layshaft 38 include a plurality of layshaft gears 40 rotatably supported thereon, and in meshing engagement with one of a plurality of transmission shaft gears 42 disposed on one of the first transmission shaft 26 or the second transmission shaft 32.

The dual clutch transmission 20 further includes a plurality of synchronizers 44. Each of the synchronizers 44 rotatably couples at least one of the layshaft gears 40 to one of the first layshaft 36 or the second layshaft 38 for torque transmitting rotation therewith. A synchronizer actuator fork 46 moves each of the synchronizers 44 into engagement with one of the layshaft gears 40. The dual clutch transmission 20 includes multiple synchronizer actuator forks 46 to move the various synchronizers 44 into and out of engagement.

As noted above, the dual clutch transmission 20 includes the transmission control module 34, to control the operation of the dual clutch transmission 20. The transmission control module 34 may include a computer and/or processor, and include all software, hardware, memory, algorithms, connections, sensors, etc., necessary to manage and control the operation of the dual clutch transmission 20. As such, a method of operating the dual clutch transmission 20, and more specifically a method of learning or identifying a kiss point for both of the first clutch 22 and the second clutch 24 may be embodied as a program operable on the transmission control module 34. It should be appreciated that the transmission control module 34 may include any device capable of analyzing data from various sensors, comparing data, making the necessary decisions required to control the operation of the dual clutch transmission 20, and executing the required tasks necessary to control the operation of the dual clutch transmission 20.

In order to get fast responding, smooth operation from the dual clutch transmission 20, the movement of the first clutch 22 and the second clutch 24, and more particularly the kiss point of each of the first clutch 22 and the second clutch 24 must be known so that the first clutch 22 and the second clutch 24 may be consistently and predictably actuated and controlled. Accordingly, the method of learning or identifying the kiss point for reach of the first clutch 22 and the second clutch 24, described below, provides the transmission control module 34 with the positional information required to provide consistent and predictable movement of the first clutch 22 and the second clutch 24 to ensure quick, smooth shifts.

The method of operating the dual clutch transmission 20 includes providing the transmission control module 34 that is operable to control the operation of the dual clutch transmission 20. As noted above, the transmission control module 34 includes all software, hardware, memory, algorithms, connections, sensors, etc. necessary to manage and control the operation of the dual clutch transmission 20. The control module is operable to perform the various tasks of the method described below.

The method includes determining whether both the first clutch 22 and the second clutch 24 are disengaged from the input shaft 28, and determining whether both the first transmission shaft 26 and the second transmission shaft 32 are disengaged from an output shaft 62 of the dual clutch transmission 20. If either one of the first clutch 22 and/or the second clutch 24 are currently disposed in the engaged position, interconnecting the input shaft 28 of the dual clutch transmission 20 with one of the first transmission shaft 26 or the second transmission shaft 32 respectively, then the engaged first clutch 22 or second clutch 24 must be moved to the disengaged position. In order to prevent torque transmission to the output shaft 62 of the dual clutch transmission 20 during the test procedure, the first transmission shaft 26 and the second transmission shaft 32 must be disconnected from the output shaft 62. The first transmission shaft 26 and the second transmission shaft 32 are disconnected from the output shaft 62 when all of the synchronizers 44 are disengaged from their respective layshaft gears 40. The transmission control module 34 may determine whether the first clutch 22 and the second clutch 24 are disengaged from the input shaft 28, and whether the first transmission shaft 26 and the second transmission shaft 32 are disengaged from the output shaft 62 in any suitable manner, such as with position sensors or the like.

The rotational speed of the input shaft 28 is then controlled to be within a pre-determined range. Preferably, the pre-determined range is between the range of 500 and 100 revolutions per minute. However, it should be appreciated that the pre-defined range may differ from the exemplary range provided. The rotational speed of the input shaft 28 may be controlled in any suitable manner. For example, if the method is being executed during assembly of the vehicle, then the rotational speed of the input shaft 28 may be controlled by a dynamometer. Alternatively, if the method is being executed during service or repair of the transmission, then the rotational speed of the input shaft 28 may be controlled by an engine of the vehicle, such as by operating the engine of the vehicle at an idle speed.

When both the first clutch 22 and the second clutch 24 are determined to be disengaged from the input shaft 28, both the first transmission shaft 26 and the second transmission shaft 32 are determined to be disengaged from the output shaft 62, and when the rotational speed of the input shaft 28 is within the pre-determined range, then the first clutch 22 is moved from the disengaged position toward and into the engaged position to transmit torque between the input shaft 28 and the first transmission shaft 26. The first clutch 22 may be moved in any suitable manner. For example, the first clutch 22 may be moved from the disengaged position into the engaged position by increasing a fluid pressure applied to the first clutch 22 in accordance with a pre-determined flow rate and pressure profile. The pre-determined flow rate and pressure profile is a function of time, and commands a desired flow rate to increase applied fluid pressure to the first clutch 22 at a constant, defined slope, thereby providing consistent, predictable, and repeatable results. It should be appreciated that the first clutch 22 may be moved in some other manner, such as with an electro-mechanical device/motor.

The rotational speed of the first transmission shaft 26 is continuously monitored while the first clutch 22 is moved from the disengaged position toward and into the engaged position. The rotational speed of the first transmission shaft 26 is monitored to detect an increase in the rotational speed of the first transmission shaft 26, which is coupled to the first clutch 22. An increase in the rotational speed of the first transmission shaft 26 indicates that the first clutch 22 is transmitting torque from the input shaft 28 to the first transmission shaft 26. Accordingly, the position of the first clutch 22 when the rotational speed of the first transmission shaft 26 increases by a pre-determined amount may be defined as the kiss point of the first clutch 22. In order to identify the kiss point of the first clutch 22, the position of the first clutch 22 is continuously monitored while monitoring the rotational speed of the first transmission shaft 26. When the increase in the rotational speed of the first transmission shaft 26 is detected, the position of the first clutch 22 may be identified, and saved in the memory of the transmission control module 34 as a learned first clutch 22 kiss point.

Figure 2:
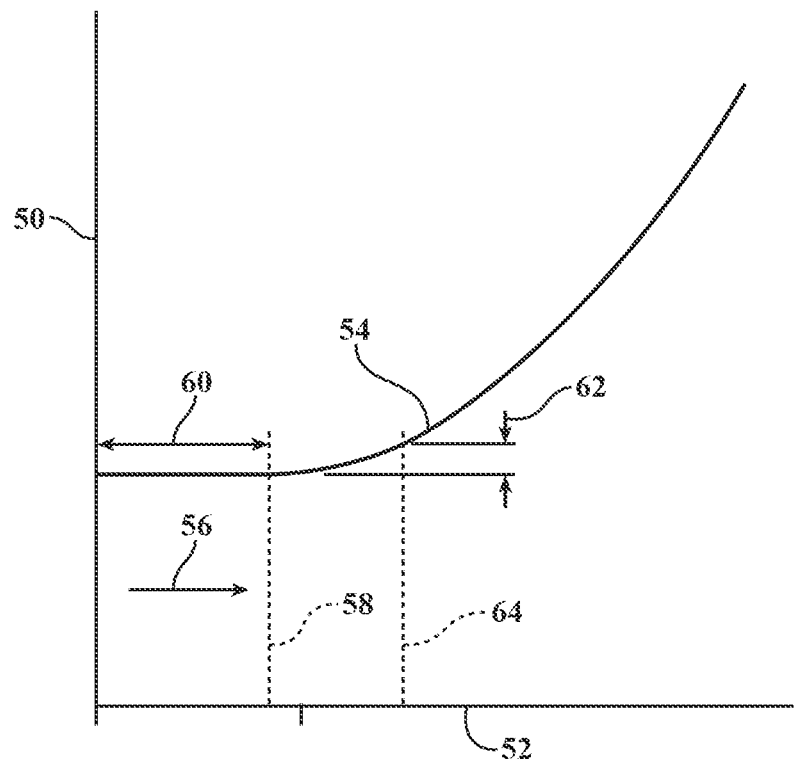
FIG. 2 is a graph showing a rotational speed of a first transmission shaft vs. a position of a first clutch, and identifying a kiss point of the first clutch.

Referring to FIG. 2, rotational speed is shown along a vertical axis 50, and a position of the first clutch 22 is shown along a horizontal axis 52. The rotational speed of the first transmission shaft 26 is generally shown by the reference line 54. As shown in FIG. 2, the rotational speed of the first transmission shaft 26 remains constant within a region 60. The rotational speed of the first transmission shaft 26 remains constant as the first clutch 22 moves in a direction indicated by arrow 56. At the clutch position indicated by reference line 58, the rotational speed of the first transmission shaft 26 begins to increase. The kiss point of the first clutch 22 is identified as the location at which the rotational speed of the first transmission shaft 26 increases by a pre-determined amount above the average rotational speed of the first transmission shaft 26 in region 60. The pre-determined increase in the rotational speed of the first transmission shaft 26 is indicated by dimension line 62, and occurs at the clutch position indicated by reference line 64. Accordingly, it should be appreciated that the reference line 64 represents the kiss point of the first clutch 22.

The method may further include repeatedly identifying and saving the learned first clutch 22 kiss point in the memory of the transmission control module 34 to accumulate a plurality of learned first clutch 22 kiss points. The plurality of learned first clutch 22 kiss points may be mathematically averaged to define an average first clutch 22 kiss point. The average first clutch 22 kiss point may then be used to control the first clutch 22 during operation of the dual clutch transmission 20.

The above described method may be repeated to identify the kiss point for the second clutch 24. If the first clutch 22 remains in the engaged position, then the first clutch 22 is first moved from the engaged position into the disengaged position so that both the first clutch 22 and the second clutch 24 are disengaged from the input shaft 28.

When both the first clutch 22 and the second clutch 24 are determined to be disengaged from the input shaft 28, both the first transmission shaft 26 and the second transmission shaft 32 are determined to be disengaged from the output shaft 62, and when the rotational speed of the input shaft 28 is within the pre-determined range, then the second clutch 24 is moved from the disengaged position toward and into the engaged position to transmit torque between the input shaft 28 and the second transmission shaft 32. The second clutch 24 is moved from the disengaged position into the engaged position by increasing a fluid pressure applied to the second clutch 24 in accordance with the pre-determined flow rate and pressure profile.

The rotational speed of the second transmission shaft 32 is continuously monitored while the second clutch 24 is moved from the disengaged position toward and into the engaged position. The rotational speed of the second transmission shaft 32 is monitored to detect an increase in the rotational speed of the second transmission shaft 32, which is coupled to the second clutch 24. An increase in the rotational speed of the second transmission shaft 32 indicates that the second clutch 24 is transmitting torque from the input shaft 28 to the second transmission shaft 32. Accordingly, the position of the second clutch 24 when the second transmission shaft 32 begins to rotate may be defined as the kiss point of the second clutch 24. In order to identify the kiss point of the second clutch 24, the position of the second clutch 24 is continuously monitored while monitoring the rotational speed of the second transmission shaft 32. When the increase in the rotational speed of the second transmission shaft 32 is detected, the position of the second clutch 24 may be identified, and saved in the memory of the transmission control module 34 as a learned second clutch 24 kiss point.

The method may further include repeatedly identifying and saving the learned second clutch 24 kiss point in the memory of the transmission control module 34 to accumulate a plurality of learned second clutch 24 kiss points. The plurality of learned second clutch 24 kiss points may be mathematically averaged to define an average second clutch 24 kiss point. The average second clutch 24 kiss point may then be used to control the second clutch 24 during operation of the dual clutch transmission 20.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method of operating a transmission, the method comprising:
   determining that a first clutch is disengaged from an input shaft;
   controlling a rotational speed of the input shaft to be within a pre-determined range;
   moving the first clutch from a disengaged position into an engaged position when the first clutch is determined to be disengaged from the input shaft, and when the rotational speed of the input shaft is within the pre-determined range;
   detecting an increase in a rotational speed of a first transmission shaft coupled to the first clutch;
   identifying a position of the first clutch when the increase in the rotational speed of the first transmission shaft is detected; and
   saving the identified position of the first clutch in a memory of a transmission control module as a learned first clutch kiss point.

2. A method as set forth in claim 1 further comprising repeatedly identifying and saving the learned first clutch kiss point in the memory of the transmission control module to accumulate a plurality of learned first clutch kiss points saved in the memory of the transmission control module.

3. A method as set forth in claim 2 further comprising averaging the plurality of learned first clutch kiss points to define an average first clutch kiss point.

4. A method as set forth in claim 3 further comprising controlling the actuation of the first clutch based on the average first clutch kiss point.

5. A method as set forth in claim 1 wherein moving the first clutch from a disengaged position into an engaged position includes increasing a fluid pressure applied to the first clutch in accordance with a pre-determined flow rate and pressure profile.

6. A method as set forth in claim 1 further comprising determining that a first transmission shaft is disengaged from an output shaft.

7. A method as set forth in claim 1 further comprising continuously monitoring the rotational speed of the first transmission shaft while moving the first clutch from the disengaged position into the engaged position.

8. A method as set forth in claim 7 further comprising continuously monitoring the position of the first clutch while continuously monitoring the rotational speed of the first transmission shaft.

9. A method as set forth in claim 1 wherein controlling the rotational speed of the input shaft to be within the pre-determined range is further defined as controlling the rotational speed of the input shaft to be within the pre-determined range of between 500 and 100 revolutions per minute.

10. A method as set forth in claim 1 further comprising:
    moving a second clutch from a disengaged position into an engaged position;
    detecting an increase in a rotational speed of a second transmission shaft coupled to the second clutch;
    identifying a position of the second clutch when the increase in the rotational speed of the second transmission shaft is detected; and
    saving the identified position of the second clutch in the memory of the transmission control module as a learned second clutch kiss point.

11. A method as set forth in claim 10 further comprising:
    repeatedly identifying and saving the learned second clutch kiss point in the memory of the transmission control module to accumulate a plurality of learned second clutch kiss points saved in the memory of the transmission control module;
    averaging the plurality of learned second clutch kiss points to define an average second clutch kiss point; and
    controlling the actuation of the second clutch based on the average second clutch kiss point.

12. A method as set forth in claim 11 further comprising providing a transmission control module including all hardware and software necessary to:
    determine that both the first clutch and the second clutch are disengaged from the input shaft;
    determine that both the first transmission shaft and a second transmission shaft are disengaged from the output shaft;
    control a rotational speed of the input shaft to be within a pre-determined range;
    move the first clutch from the disengaged position into the engaged position;
    detect an increase in the rotational speed of the first transmission shaft;
    identify the position of the first clutch when the increase in the rotational speed of the first transmission shaft is detected; and
    save the identified position of the first clutch in the memory of the transmission control module as the learned first clutch kiss point.

13. A method of learning a kiss point for both a first clutch and a second clutch of a dual clutch transmission, the method comprising:
    determining that both a first clutch and a second clutch are disengaged from an input shaft;
    determining that both a first transmission shaft that is coupled to the first clutch, and a second transmission shaft that is coupled to the second clutch, are disengaged from an output shaft;
    controlling a rotational speed of the input shaft to be within a pre-determined range;
    moving the first clutch from a disengaged position into an engaged position when both the first clutch and the second clutch are determined to be disengaged from the input shaft, both the first transmission shaft and the second transmission shaft are determined to be disengaged from the output shaft, and the rotational speed of the input shaft is within the pre-determined range, to engage the first transmission shaft and the input shaft;
    detecting an increase in a rotational speed of the first transmission shaft coupled to the first clutch;
    identifying a position of the first clutch when the increase in the rotational speed of the first transmission shaft is detected; and
    saving the identified position of the first clutch in a memory of a transmission control module as a learned first clutch kiss point.

14. A method as set forth in claim 13 further comprising moving the first clutch from the engaged position into the disengaged position to disengage the first transmission shaft from the input shaft.

15. A method as set forth in claim 14 further comprising:
    moving the second clutch from a disengaged position into an engaged position when both the first clutch and the second clutch are determined to be disengaged from the input shaft, both the first transmission shaft and the second transmission shaft are determined to be disengaged from the output shaft, and when the rotational speed of the input shaft is within the pre-determined range, to engage the second transmission shaft and the input shaft;

detecting an increase in a rotational speed of the second transmission shaft coupled to the second clutch;

identifying a position of the second clutch when the increase in the rotational speed of the second transmission shaft is detected; and saving the identified position of the second clutch in the memory of the transmission control module as a learned second clutch kiss point.

16. A method as set forth in claim 15 further comprising repeatedly identifying and saving the learned first clutch kiss point and the learned second clutch kiss point in the memory of the transmission control module to accumulate a plurality of learned first clutch kiss points and a plurality of learned second clutch kiss points saved in the memory of the transmission control module.

17. A method as set forth in claim 16 further comprising averaging the plurality of learned first clutch kiss points to define an average first clutch kiss point, and averaging the plurality of learned second clutch kiss points to define an average second clutch kiss point.

18. A method as set forth in claim 17 further comprising controlling the actuation of the first clutch based on the average first clutch kiss point, and controlling the actuation of the second clutch based on the average second clutch kiss point.

19. A method as set forth in claim 15 further comprising continuously monitoring the rotational speed of the first transmission shaft while moving the first clutch from the disengaged position into the engaged position, and continuously monitoring the rotational speed of the second transmission shaft while moving the second clutch from the disengaged position into the engaged position.

20. A method as set forth in claim 19 further comprising continuously monitoring the position of the first clutch while continuously monitoring the rotational speed of the first transmission shaft, and continuously monitoring the position of the second clutch while continuously monitoring the rotational speed of the second transmission shaft.

* * * * *